(12) United States Patent
Demers et al.

(10) Patent No.: US 6,321,597 B1
(45) Date of Patent: Nov. 27, 2001

(54) SYSTEM AND METHOD FOR MEASURING VOLUME OF LIQUID IN A CHAMBER

(75) Inventors: Jason A. Demers, Manchester; Marc A. Mandro, Bow, both of NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 09/322,477

(22) Filed: May 28, 1999

(51) Int. Cl.$^7$ .................................................. G01F 23/00
(52) U.S. Cl. .................................... 73/290 B; 73/149
(58) Field of Search ....................... 73/19.05, 149, 73/290 B

(56) References Cited

U.S. PATENT DOCUMENTS

| | | | |
|---|---|---|---|
| 3,776,229 | * 12/1973 | McPhee | 128/214 |
| 4,840,064 | 6/1989 | Fudim | 73/290 B |
| 4,984,457 | * 1/1991 | Morris | 73/149 |
| 5,349,852 | * 9/1994 | Kamen et al. | 73/149 |
| 5,583,897 | * 12/1996 | Hill | 73/149 |
| 5,584,300 | * 12/1996 | Galdes | 73/149 |
| 5,628,908 | * 5/1997 | Kamen et al. | 210/646 |
| 6,062,066 | * 5/2000 | Loen | 73/149 |
| 6,128,518 | * 10/2000 | Billings et al. | 600/345 |

FOREIGN PATENT DOCUMENTS

WO 99/10028  3/1999  (WO).

OTHER PUBLICATIONS

SU 1 670 418 A (Uralsky NII Trubnoj Promy) Aug. 15, 1991 Abstract.

* cited by examiner

Primary Examiner—Hezron Williams
Assistant Examiner—Katina Wilson
(74) Attorney, Agent, or Firm—Bromberg & Sunstein LLP

(57) ABSTRACT

Methods and systems for measuring the volume of a liquid in a subject chamber, such as the mixing chamber in a system for mixing and delivering drugs, for example. A volume of a control gas in communication with the subject chamber is isolated, such that the total volume of the control gas and the liquid is held constant, and the initial pressure of the control gas is measured. Then, a known volume of liquid is moved into or out of the subject chamber. This known volume may be exchanged between the subject chamber and a measurement chamber, in order to determine this volume. The final pressure of the control gas is also measured after the reference volume has been removed from or added to the chamber and while the volume of control gas remains otherwise isolated. The volume of liquid in the chamber may then be measured based on (a) the initial pressure, (b) the final pressure, (c) the reference volume and (d) the volume of gas in the subject chamber when the subject chamber is empty of liquid.

32 Claims, 6 Drawing Sheets

SYSTEM AND METHOD FOR MEASURING VOLUME OF LIQUID IN A CHAMBER

TECHNICAL FIELD

The present invention relates to systems and methods for measuring the volume of liquid in a chamber.

SUMMARY OF THE INVENTION

The invention includes methods for measuring the volume of a liquid in a subject chamber, such as the mixing chamber in a system for mixing and delivering drugs, for example. In a preferred method, a volume of a control gas in communication with the subject chamber is isolated, such that the total volume of the control gas and the liquid is held constant, and the initial pressure of the control gas is measured. Then, a known (i.e., measured or measurable) volume of liquid—referred to herein as a reference volume—is moved into or out of the subject chamber. In a preferred method, the reference volume is exchanged between the subject chamber and a measurement chamber, such as a delivery chamber, where the reference volume is measured. The final pressure of the control gas is also measured after the reference volume has been removed from or added to the chamber and while the volume of control gas remains otherwise isolated. The volume of liquid in the chamber may then be measured based on (a) the initial pressure, (b) the final pressure, (c) the reference volume and (d) the volume of gas in the subject chamber when the subject chamber is empty of liquid.

A system for measuring the volume of a liquid in the subject chamber, according to a preferred embodiment of the invention, includes an isolatable volume of a control gas in communication with the subject chamber such that the total volume of the subject-chamber control gas and the liquid in the subject chamber may be held constant; a port through which liquid may flow into and out of the subject chamber; and a transfer system that causes the reference volume of the liquid to flow through the port. The system also includes a controller, which controls the transfer system. The controller also receives data from a pressure sensor in communication with the isolatable volume and from a delta-volume system that measures the reference volume. The controller also calculates the volume of liquid in the subject chamber based on the pressure data, the reference volume and the volume of gas in the subject chamber when the subject chamber is empty of liquid.

In a preferred embodiment, the transfer system causes the reference volume of the liquid to flow between the subject chamber and a measurement chamber, and the delta-volume system includes means for measuring the change in volume of a control gas in the measurement chamber when the reference volume flows through the port. Preferably, this means for measuring the change in volume of the control gas includes an acoustic volume-measurement system, which applies vibrations to the control gas in the measurement chamber and measures the response of the control gas to the applied vibrations. Preferably, the acoustic volume-measurement system calculates the reference volume based on a resonant frequency of the control gas in the second chamber.

The transfer system preferably includes one or more pressure adjusters for adjusting the pressure of a control gas. In a preferred embodiment, the pressure adjuster includes means for adding or removing a control gas, to or from the subject chamber and/or the measurement chamber. The pressure adjuster preferably includes positive- and negative-pressure reservoirs, which urge control gas into or out of the chambers.

A preferred embodiment of a system, incorporating the present invention, for mixing and delivering medical liquids to a patient includes a solvent-supply port; a solute-supply port; an outlet; a measurement (or delivery) chamber; a mixing chamber; a valve system which controls flow among the solvent-supply port, the solute-supply port, the outlet, the measurement chamber and the mixing chamber; an isolatable volume of a control gas in communication with the mixing chamber such that the total volume of the control gas and the liquid in the mixing chamber may be held constant; a pressure sensor in communication with the isolatable volume; a pressure adjuster which urges fluid into or out of the mixing chamber; a delta-volume system which measures changes in volume of liquid in the measurement chamber; and a controller, which (i) controls the valve system and the pressure adjuster so as to cause a reference volume of liquid to flow between the mixing chamber and the measurement chamber, (ii) receives pressure data from the pressure sensor before and after the reference volume of liquid has flown between the mixing chamber and the measurement chamber, (iii) receives volume data from the delta-volume system, and (iv) calculates the volume of liquid in the mixing chamber based on (a) the pressure data, (b) the reference volume and (c) the volume of gas in the mixing-chamber when the mixing chamber is empty of liquid.

BRIEF DESCRIPTION OF THE FIGURES

These and other features, aspects and advantages of the present invention will become better understood with reference to the following description, appended claims and accompanying drawings where:

DETAILED DESCRIPTION OF SPECIFIC EMBODIMENTS

Figure 1:
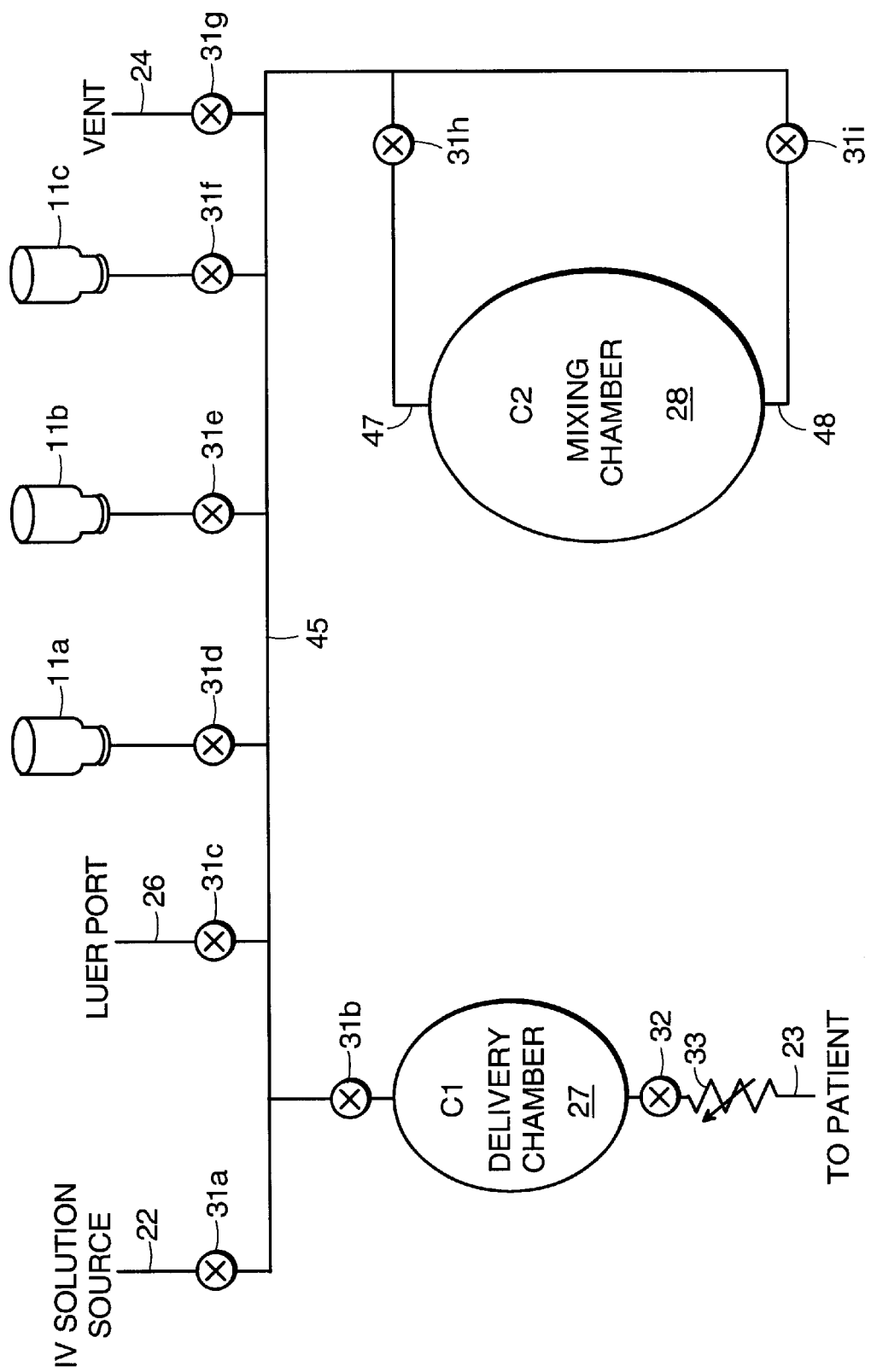
FIG. 1 is a schematic depicting a system for mixing and delivering medical liquids according to a preferred embodiment of the invention.

In a system that automatically mixes and delivers intravenous drugs to a patient and that uses a mixing chamber and a delivery chamber—and in particular, in the system described in U.S. patent application for "System, Method and Cassette for Mixing and Delivering Intravenous Drugs," Ser. No. 09/137,025 filed Aug. 20, 1998 (which application is incorporated herein by reference along with its counterpart, International Application No. PCT/US98/17313)—it is desirable at times to know the volume of liquid in the mixing chamber. FIG. 1 is a schematic depicting such a system. The system includes a port 22 for connecting to an IV fluid source. This IV fluid is used as a solvent for mixing drugs. Another port 26 connects the system to a source of a liquid medication, which may or may not be diluted with the IV fluid before delivery to the patient. The system also accepts vials 11a–11c, which may contain liquid medication or powdered solute. The system permits mixing a solution from powdered solutes contained in vials 11a–11c. Valve 31a controls the flow of the solvent into the system, while valves 31c–31f control flow to and from the sources of liquid and powdered solute. The system also preferably includes a vent 24, which is controlled by valve 31g and which may be used to equalize pressure in the system.

The system includes a delivery chamber 27 and a mixing chamber 28. A manifold 45 connects the chambers 27, 28, the ports 22, 26, the vials 11a–11c and the vent 24. Valve 31b controls flow between the delivery chamber 27 and the manifold 45. Valves 32 and 33 control the flow of IV solution from the delivery chamber 27 to the conduit 23 leading to the patient. Because the mixing chamber 28 will often contain some gas in addition to liquid, the mixing chamber is preferably provided two mouths: a top mouth 47 for permitting gas to be drawn from the mixing chamber and a bottom mouth 48 for permitting liquid to be drawn from the mixing chamber. Flow through the top and bottom mouths 47, 48 is controlled respectively by valves 31h and 31i.

The delivery chamber 27 measures the amount of solvent drawn from the IV fluid port 22. Typically several boluses of solvent are drawn and urged to the mixing chamber 28. When the desired amount of solvent is collected in the mixing chamber 28, the solvent is then mixed with the solute. For powdered solutes, the solvent is urged back and forth between the mixing chamber 28 and one of the vials 11a–11c, in order to dissolve the powder fully. Once the solute and solvent are mixed, a bolus of the mixture is urged from the mixing chamber 28 to the delivery chamber 27, where the volume of this mixture bolus may be measured. This bolus may be delivered to the patient directly. Alternatively, the mixture may be diluted further by the introduction of additional solvent from port 22 into the delivery chamber 27, after which the diluted mixture may be delivered to the patient.

Both the mixing chamber 28 and the delivery chamber 27 are preferably provided with means for urging liquid out of the chamber and drawing liquid into the chamber. As discussed in greater detail below, such means preferably adjust the pressure of a control gas in order to force liquid into or out of the chamber.

The delivery chamber 27 is provided with an accurate system for measuring the volume of liquid being drawn into or expelled from the delivery chamber. Such a system is described in U.S. Pat. No. 5,349,852 for a "Pump Controller Using Acoustic Spectral Analysis" to Kamen et al. and its progeny (U.S. Pat. Nos. 5,526,844; 5,533,389 and 5,575,310), which are incorporated herein by reference. These patents describe acoustic volume-measurement systems, which use sound waves to determine the volume of gas in a chamber. Changes in the volume of gas in the delivery chamber indicate opposite and equal changes in the volume of liquid in the delivery chamber. As shown in U.S. Pat. No. 5,349,852, positive- and negative-pressure reservoirs are used to urge fluid out of and draw fluid into the chamber. The positive- and negative-pressure reservoirs are connected through the acoustic volume-measurement system to the chamber. (See, for example, FIGS. 5–8 of U.S. Pat. No. 5,349,852.)

In the system shown in FIG. 1 of the present application, an acoustic volume-measurement system is preferably used to calculate changes in the volume of gas—and accordingly, changes in the volume of liquid—in the delivery chamber 27. Through use of the procedure described hereinbelow, the acoustic volume-measurement system associated with the delivery chamber 27 can be used to calculate the volume of liquid in the mixing chamber 28. It will be appreciated that by employing a single acoustic volume-measurement system to measure the volume of both the delivery chamber 27 and mixing chamber 28 significant cost savings can be obtained.

Figure 2:
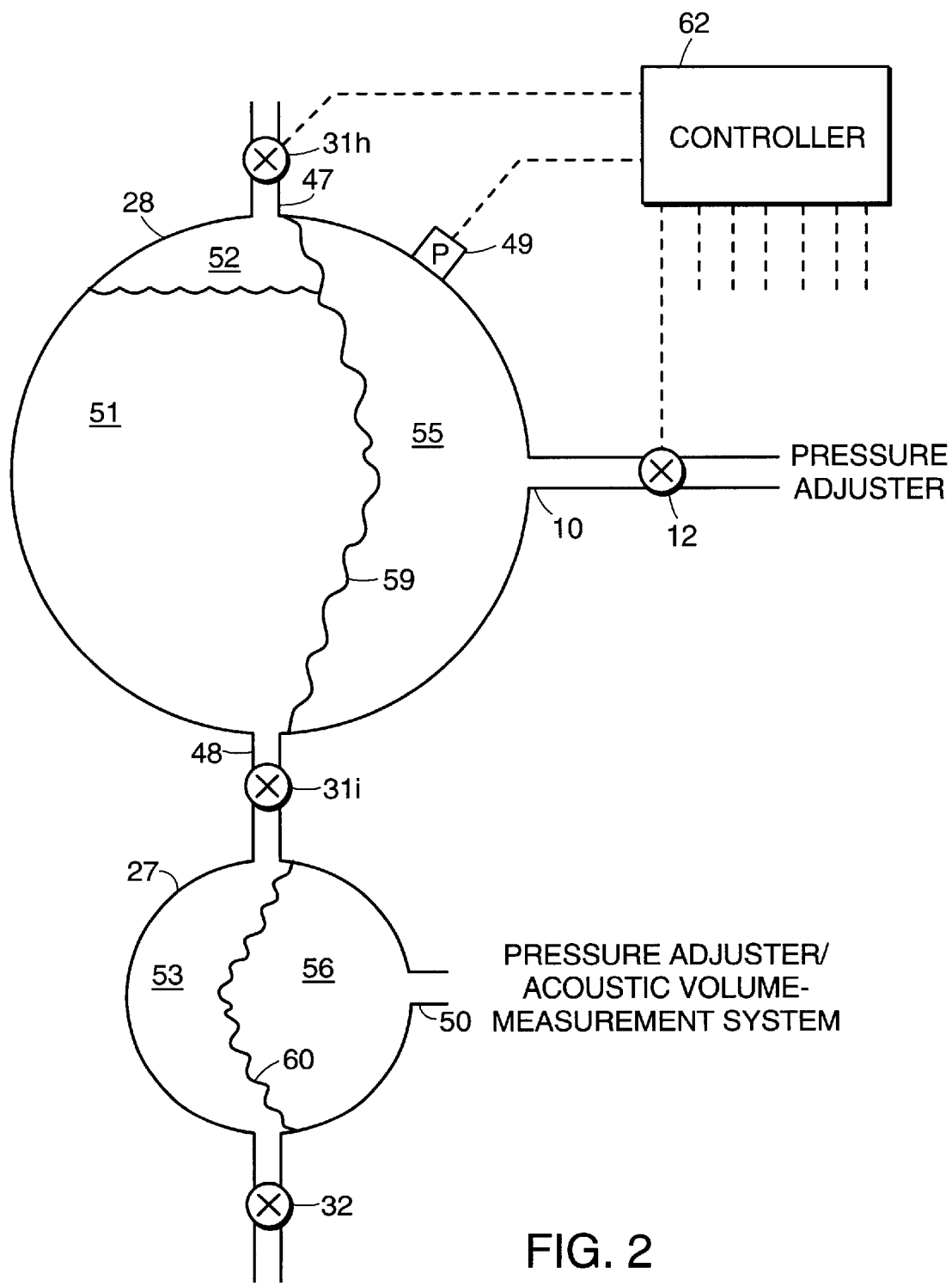
FIG. 2 is a schematic depicting a system, using components of the FIG.1 system, for measuring the volume of liquid in the mixing chamber according to a preferred embodiment of the invention.

FIG. 2 is a schematic representing the arrangement of some of the components of the FIG. 1 system. Many of the components of the FIG. 1 system are not shown in FIG. 2 so as to permit a clearer description of a preferred embodiment of the procedure for using the acoustic volume-measurement system of the delivery chamber 27 to measure the amount of liquid in the mixing chamber 28. For instance, the entire manifold 45 and valve 31b are not shown, even though they connect the bottom mouth 48 of the mixing chamber 28 to the delivery chamber 27. Only valve 31i is shown controlling flow between the two chambers. It will be appreciated that valve 31b may be actuated in lieu of or in conjunction with valve 31i. Moreover, it will be appreciated that the present invention may be carried out with a wide variety of different components and arrangements.

Mixing chamber 28 preferably has a larger volume than the delivery chamber 27 in order to permit a sufficient amount of solvent to be injected into the vials to dissolve the powdered solute. The mixing chamber 28 includes a membrane 59 that separates the chamber into a section that contains liquid 51 and a section that contains a control gas 55 (preferably air). The section that contains liquid 51 may also contain some gas 52. The total volume ($V_{TOTAL}$) contained by the mixing chamber 28 (i.e., the sum of the volumes of the liquid 51, the control gas 55 and the gas 52 on the liquid side of the membrane 59) is constant and is known.

The pressure of the control gas 55 in the mixing chamber 28 may be adjusted by a pressure adjuster. One of several different means of adjusting the pressure may be used, some of which are discussed below in connection with FIGS. 6–8. The pressure adjuster is in fluid communication with the mixing chamber 28 through a mouth 10 and a valve 12. The valve 12 may be closed in order to isolate the control gas 55 in the mixing chamber 28 from the pressure effects of the pressure adjuster. A pressure transducer 49 measures the pressure of the control gas 55 in the mixing chamber 28. A controller 62 receives pressure data from the transducer 49, as well as volume information from the acoustic volume-measurement system. The controller 62 also controls the pressure adjusters and the various valves 12, 31a–31i, 32 and 33. The controller also calculates the volume of liquid in the mixing chamber 28 as described below.

Like the mixing chamber, the delivery chamber 27 also has a membrane 60, which separates the chamber into a section that contains a liquid 53 and a section that contains a control gas 56. Since the presence of the gas bubble in the liquid section of the delivery chamber may in some instances affect the accuracy of the acoustic volume-measurement system, and since it is not desirable to deliver a gas bubble to the patient, any liquid that is detected to have a gas bubble in the delivery chamber 27 is urged back to either the mixing chamber 28 or the IV fluid source (item 22 in FIG. 1)—or to one of the sources of solute (such as the vials 11a–11b). The air-detection systems described in U.S. Pat. No. 5,349,852 or in U.S. Pat. No. 5,641,892 for an "Intravenous-Line-Air-Detection System" to Larkins et al.

may be used to detect the presence of a gas bubble in the liquid 53 in the delivery chamber 27. The delivery chamber 27 also has a mouth 50, which leads to the acoustic volume-measurement system and a pressure adjuster. It will be appreciated that separate mouths may be used in the delivery chamber 27 for the pressure adjuster and the acoustic volume-measurement system.

Figure 3:
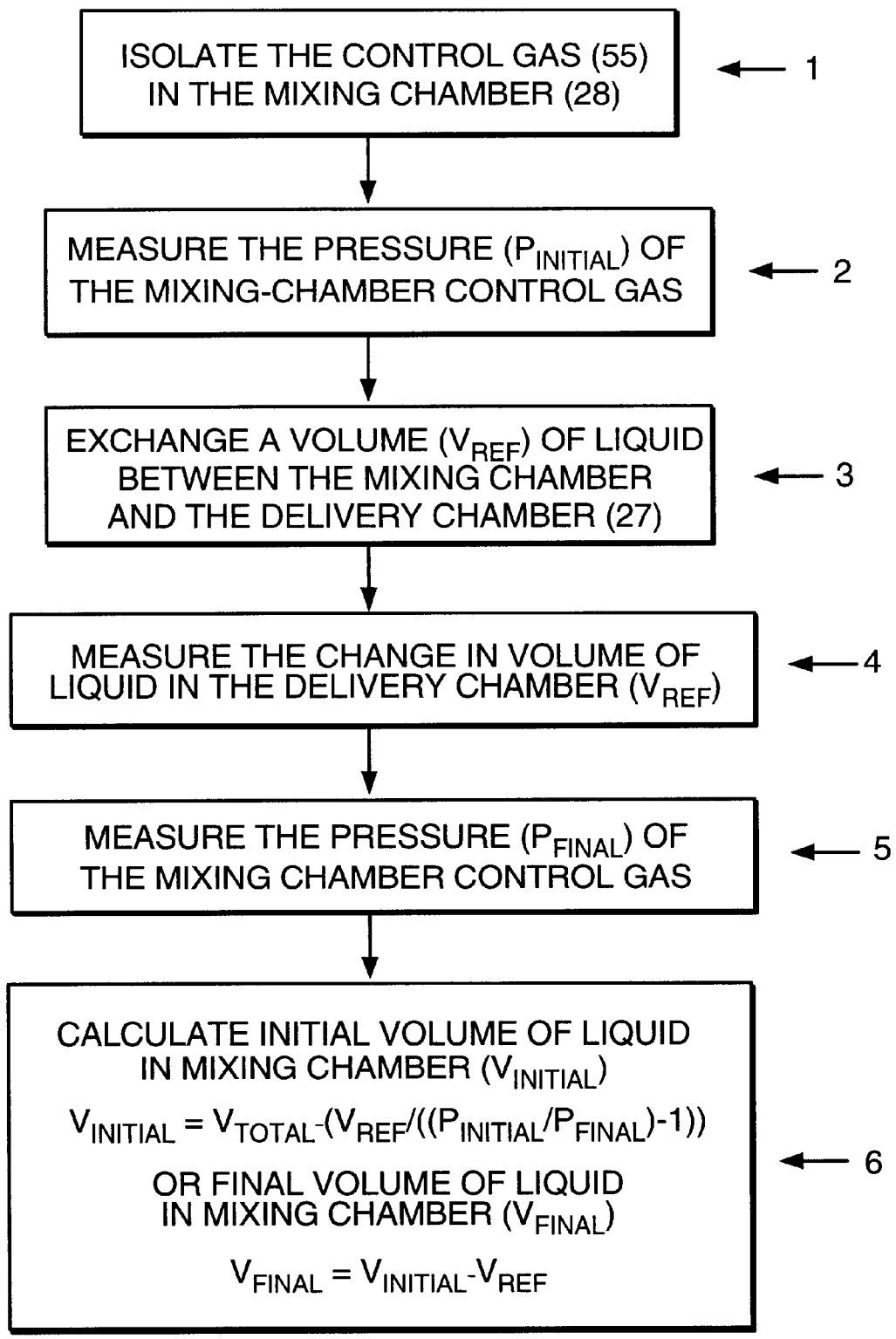
FIG. 3 shows a flow chart of a method for measuring the volume of liquid in the mixing chamber according to a preferred embodiment of the invention.
Figure 4:
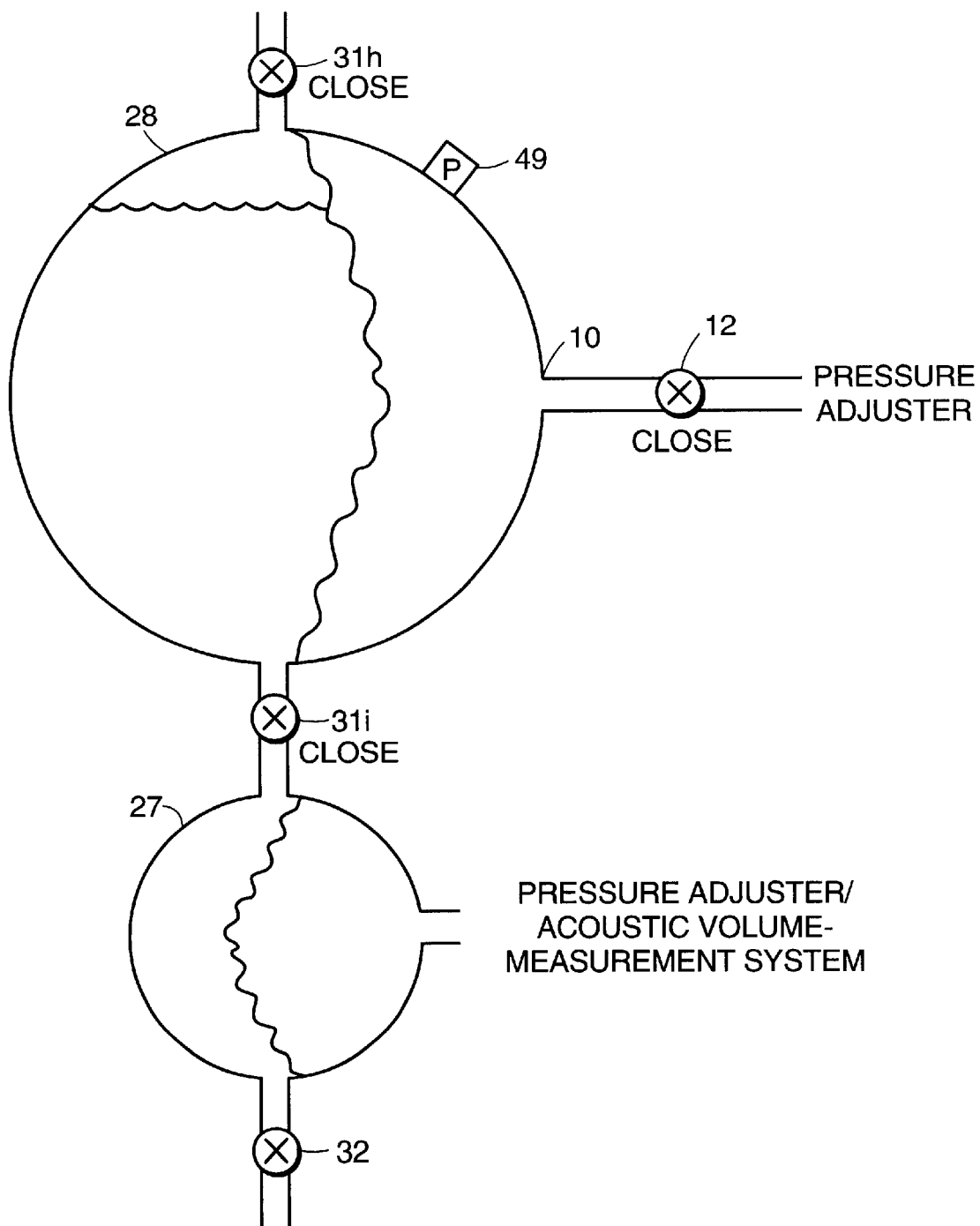
FIG. 4 shows the state of the system of FIG. 2 during step 2 of the method represented in FIG. 3.
Figure 5:
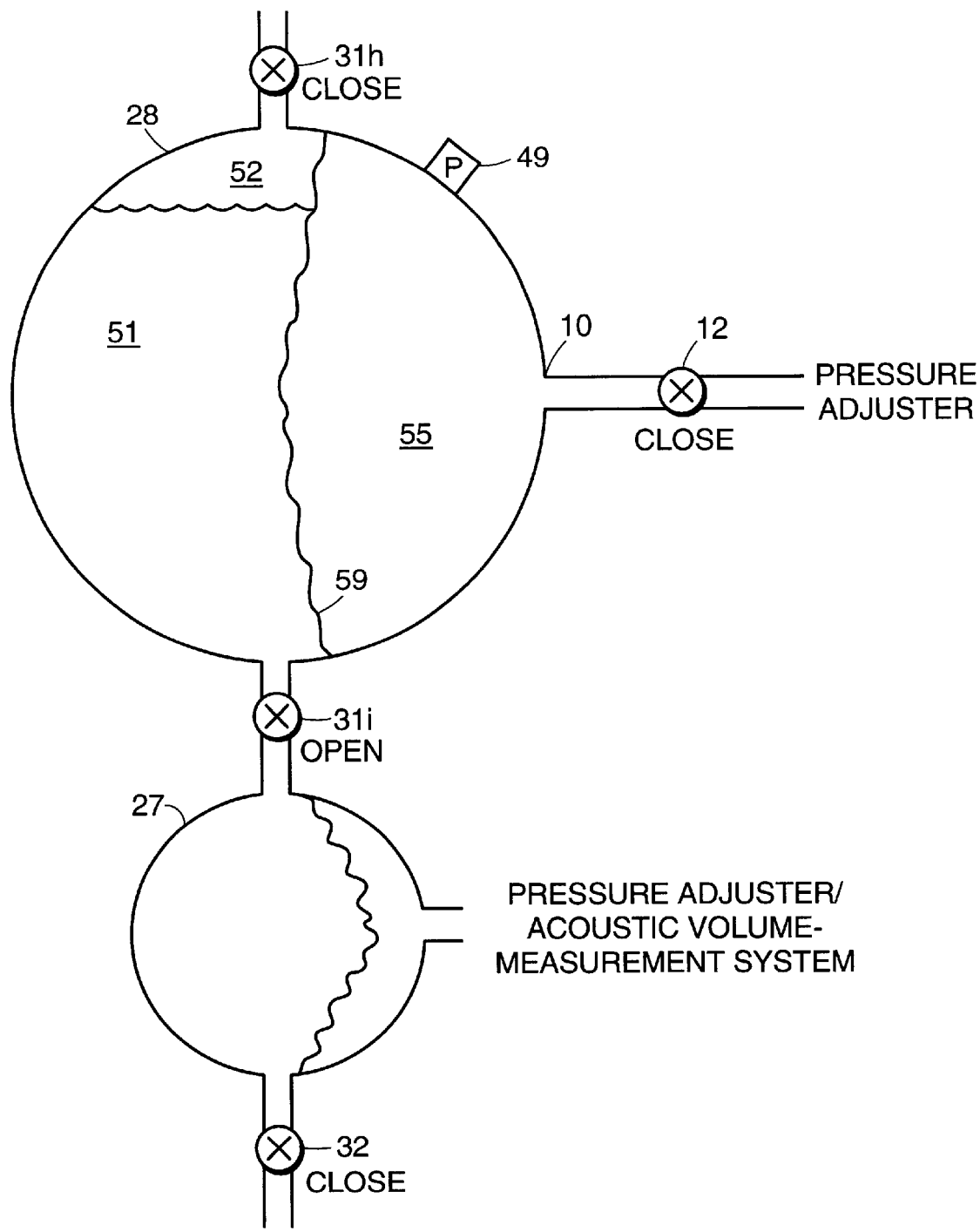
FIG. 5 shows the state of the system of FIG. 2 during step 3 of the method represented in FIG. 3.

FIG. 3 is a flow chart of a preferred method for measuring the volume of liquid in the mixing chamber 28 of the system shown in FIG. 2. In step 1, the control gas 55 in the mixing chamber 28 is isolated. (FIGS. 4 and 5 show the state of the FIG. 2 system during steps 2 and 3 respectively of a volume-measurement cycle represented by FIG. 3.) As shown in FIG. 4, valves 31$h$, 31$i$ and 12 are closed in order to initially isolate the mixing chamber 28. After the mixing chamber 28 is isolated, a pressure reading ($P_{INITIAL}$) from pressure transducer 49 is made (step 2). Once this pressure reading has been made, valve 31$i$ is opened and a volume of liquid—referred to herein as a "reference volume" ($V_{REF}$)—is exchanged between the mixing chamber 28 and the delivery chamber 27 (step 3). As shown in FIG. 5, valve 31$h$ remains closed during step 3 in order to prevent the gas 52 on the liquid side of the membrane 59 from escaping out of the mixing chamber 28. Valve 12 also remains closed during step 3 so that the control gas 55 remains isolated and is affected only by the change in volume of the liquid 51 in the mixing chamber 28.

FIGS. 4 and 5 show the reference volume moving from the mixing chamber 28 to the delivery chamber 27 in step 3. Some of the different techniques for causing the transfer of liquid between the two chambers are discussed below. The method for calculating the volume of liquid in the mixing chamber may also be accomplished by moving a volume of liquid from the delivery chamber 27 to the mixing chamber 28. However, when the reference volume is moved from the delivery chamber 27 to the mixing chamber 28, the reference volume ($V_{REF}$) has a negative sign in the formulas set forth below.

As shown in FIG. 5, valve 32, which controls flow from the delivery chamber 27 to the patient, remains closed during step 3, as the reference volume of liquid is transferred between the mixing chamber 28 and the delivery chamber 27. Valves 31$a$ and 31$c$–31$g$, shown in FIG. 1, also remain closed during step 3. Thus, the transfer of the reference volume from the mixing chamber 28 to the delivery chamber 27 increases the volume of liquid in the delivery chamber by the amount $V_{REF}$.

After the reference volume has been transferred between the delivery chamber 27 and the mixing chamber 28 (step 3), two measurements are made: (i) the acoustic volume-measurement system is used to measure the change in the volume of liquid in the delivery chamber 27 (step 4), and (ii) the pressure transducer 49 is used to measure the final pressure ($P_{FINAL}$) in the mixing chamber 28 (step 5). (Steps 4 and 5 may be performed at the same time, or step 5 may be performed before step 4.) The change in the volume of liquid in the delivery chamber 27 is the reference volume ($V_{REF}$).

The pressure data ($P_{INITIAL}$, $P_{FINAL}$) and the volume data ($V_{REF}$) are read by the controller. The controller can then calculate (step 6) the volume ($V_{INITIAL}$) of liquid in the mixing chamber 28 at the beginning of this measurement cycle based on $P_{INITIAL}$, $P_{FINAL}$ and $V_{REF}$, as well as $V_{TOTAL}$—the total volume of the mixing chamber (i.e., the total volume of gas in the mixing chamber when the mixing chamber is emptied of liquid).

The formula for calculating the initial volume of liquid is:

$$V_{INITIAL}=V_{TOTAL}-(V_{REF}/((P_{INITIAL}\ P_{FINAL})-1)) \quad (1)$$

To determine the volume ($V_{FINAL}$) of liquid at the end of the measurement cycle, an additional calculation may be made using the formula:

$$V_{FINAL}=V_{INITIAL}-V_{REF} \quad (2)$$

These formulas may be derived from the following three formulas, which relate the volumes of liquid and gas and the pressures in the mixing chamber:

$$P_{INITIAL}V_{GAS,INITIAL}=P_{FINAL}V_{GAS,FINAL} \quad (3)$$

$$V_{REF}=V_{GAS,FINAL}-V_{GAS,INITIAL}=V_{LIQUID,INITIAL}-V_{LIQUID,FINAL} \quad (4)$$

$$V_{GAS,INITIAL}=V_{TOTAL}-V_{LIQUID,INITIAL} \quad (5)$$

$V_{LIQUID,INITIAL}$ and $V_{LIQUID,FINAL}$ are equivalent to $V_{INITIAL}$ and $V_{FINAL}$ in formulas (1) and (2). Combining equations (3) and (4) provides $$V_{REF}=((P_{INITIAL}V_{GAS,INITIAL})/P_{FINAL})-V_{GAS,INITIAL},$$

which maybe manipulated and combined with equation (5) as follows $$V_{GAS,INITIAL}=V_{REF}/((P_{INITIAL}/P_{FINAL})-1)=V_{TOTAL}-V_{LIQUID,INITIAL},$$

which in turn can be manipulated to obtain equation (1).

A variety of different systems may be employed in order to cause the exchange of the reference volume between the delivery chamber 27 and the mixing chamber 28. Both the delivery chamber 27 and the mixing chamber 28 preferably have a pressure adjuster, which adjusts the pressure of the control gas so as to tend to urge fluid into or out of the chamber. The pressure adjuster is used primarily to move liquid into or out of the chamber from or to another component of the system shown in FIG. 1. For instance, the pressure adjuster may be used in the mixing chamber 28 to cause liquid to be repeatedly squirted into and drawn out of one of the vials 11$a$–11$c$ in order to dissolve thoroughly the powdered solute in the vial. Also, the pressure adjuster may be used in the delivery chamber 27, for example, to urge IV solution to the patient, or to draw liquid into the delivery chamber from the mixing chamber or from the IV fluid source, or to urge bubble-containing liquid out of the delivery chamber into the mixing chamber or to the vent. It may also be desirable at times to use the pressure adjuster in the delivery chamber to adjust the pressure, so that the control gas in the delivery chamber is at an optimum pressure for measuring volume changes with the acoustic volume-measurement system. The two chambers preferably may make use of the same pressure adjuster, wherein fluid communication between each chamber and the pressure adjuster is controlled by a valving system; however, separate pressure adjusters may be used.

Figure 6:
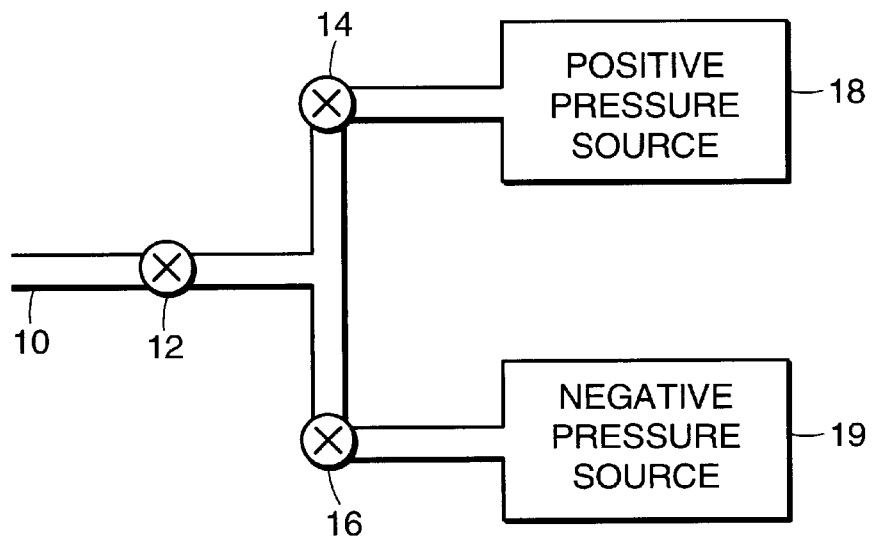
FIG. 6 shows a preferred system for adjusting the pressure in a chamber.
Figure 7:
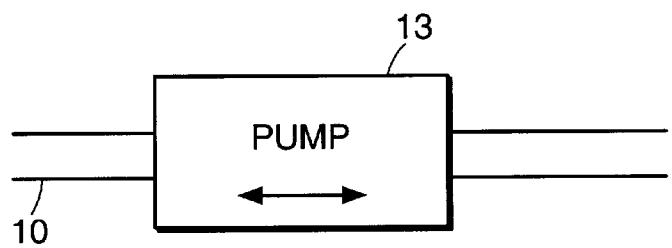
FIGS. 7 and 8 show alternative systems for adjusting the pressure in a chamber.
Figure 8:
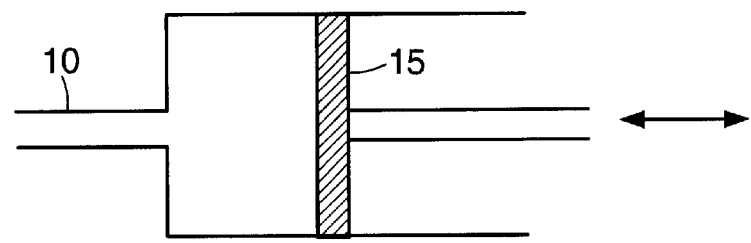

FIGS. 6–8 show a variety of pressure-adjusting systems that may be used on the delivery and the mixing chambers 27, 28. Although FIGS. 6–8 show the pressure-adjusting systems connected to the mouth 10 leading to the mixing chamber 28, similar pressure-adjusting systems may of course also be connected to the delivery chamber 27, or as noted above, the same pressure-adjusting system may be connected through valves to both chambers. FIG. 6 shows a preferred pressure-adjusting system, which is similar to the pressure-adjusting system shown in FIGS. 5–7 of U.S. Pat. No. 5,349,852. The FIG. 6 pressure-adjusting system includes a positive-pressure reservoir 18, which contains control gas under positive pressure, and a negative-pressure reservoir 19, which contains control gas at a partial vacuum. Fluid communication between these two reservoirs 18, 19 and the mouth 10 leading to the mixing chamber (or the mouth leading to the delivery chamber) is controlled by valves 12, 14 and 16. (It will be appreciated that valve 12 may be eliminated from this system, unless the same pressure-adjusting system is used for both chambers.) In order to increase the pressure of the control gas in the mixing chamber (so as to force fluid out of the mixing chamber, for instance), valve 16 is kept closed while valves 12 and 14 are opened (preferably, partially) until the desired pressure is reached in the mixing chamber. Similarly, in order to decrease the pressure of the control gas in the mixing chamber (so as to draw fluid into the mixing chamber, for instance), valve 14 is kept closed while valves 12 and 16 are opened (preferably, partially) until the desired pressure is reached in the mixing chamber. As noted previously, in using this pressure-adjusting system for the delivery chamber, the pressure-adjusting system may pass control gas through the acoustic volume-measurement system, as shown in FIGS. 5–7 of U.S. Pat. No. 5,349,852, or the pressure adjuster and the acoustic volume-measurement system may have separate mouths leading to the delivery chamber.

In a preferred method for causing a reference volume of liquid to be urged from the mixing chamber to the delivery chamber, the control gas in the mixing chamber is pressurized—to a pressure greater than the pressure in the delivery chamber—before the mixing chamber is fully isolated. Referring to FIGS. 2 and 6, valves 31$h$ and 31$i$, which control the flow into the liquid-side of the membrane 59, are closed, and valves 12 and 14 are opened in order to increase the pressure of the control gas 55 in the mixing chamber 28 by exposing the mixing chamber to the positive-pressure source 18. Once the mixing chamber 28 is pressurized, valve 12 (or 14 or both) is closed so as to isolate fully the control gas 55. Pressurizing the mixing chamber 28 has the advantage of reducing the effect that membrane 59 may have on the pressure read by transducer 49. After the initial pressure ($P_{INITIAL}$) is read, valve 31$i$ is opened, and since the mixing chamber 28 is at a higher pressure than the delivery chamber 27, some liquid will flow from the mixing chamber to the delivery chamber. In one embodiment, liquid may be allowed to flow between the mixing chamber 28 and the delivery chamber 27 until equilibrium is reached; when equilibrium is reached, the final pressure ($P_{FINAL}$) may be read by the transducer 49, and change in volume ($V_{REF}$) of liquid 53 in the delivery chamber may be measured by the acoustic volume-measurement system. In a preferred embodiment, however, it is sometimes desirable to adjust the pressure of the control gas 56 in the delivery chamber 27 in order to optimize the accuracy of the acoustic volume-measurement system. It is, thus, preferable to close valve 31$i$ after a volume ($V_{REF}$) has been transferred from the mixing chamber 28 and the delivery chamber 27 and before the final pressure ($P_{FINAL}$) is read; the pressure in the delivery chamber 27 may then be adjusted and the acoustic volume-measurement system employed to determine the reference volume. Note that valve 12 (or its equivalent, e.g., valves 14 and 16) is kept close from the initial pressure reading ($P_{INITIAL}$) until the final pressure reading ($P_{FINAL}$), so as to keep the mixing chamber's control gas isolated throughout the measurement cycle. Valves 31$h$ and 32 (as well as valves 31$a$ and 31$c$–31$g$, shown in FIG. 1) are also kept closed, so that the increase in volume of liquid in the delivery chamber is equal to the decrease in volume of liquid in the mixing chamber, thus permitting the accurate measurement of the reference volume ($V_{REF}$).

FIGS. 7 and 8 show alternative pressure-adjusting systems. The pressure-adjusting system of FIG. 7 includes a pump 13 that is capable of introducing control gas (which, as noted previously, is preferably air) into the chamber or removing control gas from the chamber and that can prevent flow through the pump so as to isolate the control gas in the chamber. The pressure-adjusting system of FIG. 8 includes a piston 15 that moves back and forth to change the pressure of the control gas in the chamber. The pressure-adjusting system of FIG. 8 may, for instance, be used to pressurize the control gas 55 of the mixing chamber 28 at the start of the measurement cycle. By moving to the left in FIG. 8, the piston 15, of course, pressurizes the control gas 55. By remaining in that position, the piston 15 isolates the control gas 55.

The reference volume may also be transferred between the chambers by adjusting the pressure of the control gas 56 in the delivery chamber 27. Once the control gas 55 in the mixing chamber 28 is isolated and the initial pressure is taken, valve 31$i$ is opened, and the pressure adjuster acting through mouth 50 may apply a negative pressure to draw the reference volume into the delivery chamber 27 or may apply a positive pressure to urge the reference volume into the mixing chamber 28. Alternatively, other means for transferring the reference volume between the chambers may be used; for instance, a peristaltic pump may be located between the chambers; or valve 31$i$ may control gravity-induced flow from the upper to the lower chamber. Alternatively, a piston/cylinder system may be substituted for the delivery chamber in this volume-measurement system, wherein the piston acts directly on the liquid. In such a system, the reference volume is known from the displacement of the piston.

Although the invention has been described with reference to several preferred embodiments, it will be understood by one of ordinary skill in the art that various modifications can be made without departing from the spirit and the scope of the invention, as set forth in the claims hereinbelow.

We claim:

1. A system for measuring the volume of a liquid in a subject chamber, the system comprising:
   an isolatable volume of subject-chamber control gas in communication with the subject chamber such that the total volume of the subject-chamber control gas and the liquid in the subject chamber may be held constant;
   a mouth through which liquid may flow into and out of the subject chamber;
   a pressure sensor in communication with the isolatable volume;
   a transfer system which causes a reference volume of the liquid to flow through the mouth; and
   a controller, which (i) controls the transfer system, (ii) receives pressure data from the pressure sensor before and after the reference volume of liquid has flown through the mouth, and (iii) calculates the volume of liquid in the subject chamber based on (a) the pressure data, (b) the reference volume and (c) the volume of gas in the subject chamber when the subject chamber is empty of liquid.

2. A system according to claim 1, further including a delta-volume system which measures the reference volume; and wherein the controller receives volume data from the delta-volume system.

3. A system according to claim 2, further comprising a second chamber in fluid communication with the mouth, wherein the transfer system causes the reference volume of the liquid to flow between the subject chamber and the second chamber, and wherein the delta-volume system includes second-chamber-volume means for measuring the change in the volume of a second-chamber control gas in the second chamber when the reference volume flows through the mouth.

4. A system according to claim 3, wherein the second-chamber-volume means includes means for applying vibrations to the second-chamber control gas and measuring the response of the second-chamber control gas to the applied vibrations.

5. A system according to claim 4, wherein the second-chamber-volume means includes means for calculating the reference volume based on a resonant frequency of the control gas in the second chamber.

6. A system according to claim 4, wherein the transfer system includes a pressure adjuster.

7. A system according to claim 6, wherein the pressure adjuster includes an isolatable-volume pressure adjuster which adjusts the pressure of the control gas in the isolatable volume.

8. A system according to claim 7, wherein the isolatable-volume pressure adjuster includes means for adding or removing control gas from the isolatable volume, wherein in order to isolate the isolatable volume, control gas is prevented from flowing to or from the isolatable volume.

9. A system according to claim 8, wherein the isolatable-volume pressure adjuster includes positive- and negative-pressure reservoirs, which urge control gas into or out of the isolatable volume.

10. A system according to claim 9, wherein the pressure adjuster includes means for adding or removing a control gas to or from the second chamber.

11. A system according to claim 6, wherein the pressure adjuster includes means for adding or removing a control gas to or from the second chamber.

12. A system for measuring the volume of a liquid in a subject chamber, the system comprising:
   transfer means for causing a reference volume of liquid to flow into and out of the subject chamber;
   an isolatable volume of a control gas in communication with the subject chamber such that the total volume of the control gas and the liquid is held constant;
   pressure-measurement means for measuring pressure in the isolatable volume; and
   control means for (i) controlling the transfer means, (ii) receiving pressure data from the pressure sensor before and after the reference volume of liquid has flown to or from the subject chamber, and (iii) calculating the volume of liquid in the chamber based on the pressure data, the reference volume and the volume of gas in the subject chamber when the subject chamber is empty of liquid.

13. A system according to claim 12, further including delta-volume means for measuring the reference volume of liquid moved into or out of the subject chamber; and wherein the control means receives volume data from the delta-volume means.

14. A system according to claim 13, further comprising a second chamber in fluid communication with the subject chamber, wherein the transfer means causes the portion of the liquid to flow between the subject chamber and the second chamber, and wherein the delta-volume means includes second-chamber-volume means for measuring the change in volume of a control gas in the second chamber before and after the reference volume flows between the subject chamber and the second chamber.

15. A system according to claim 14, wherein the second-chamber-volume means includes means for applying vibrations to the control gas in the second chamber and measuring the response of the control gas to the applied vibrations.

16. A system according to claim 14, wherein the transfer system includes means for adjusting pressure.

17. A system according to claim 16, wherein the means for adjusting pressure adjusts the pressure of the control gas in the isolatable volume.

18. A system according to claim 17, wherein the means for adjusting pressure includes means for adding or removing control gas from the isolatable volume, wherein in order to isolate the isolatable volume, control gas is prevented from flowing to or from the isolatable volume.

19. A system according to claim 18, wherein the means for adjusting pressure includes positive- and negative-pressure reservoirs, which urge control gas into or out of the isolatable volume.

20. A system according to claim 18, wherein the means for adjusting pressure adds or removes a control gas to or from the second chamber.

21. A system according to claim 16, wherein the means for adjusting pressure adds or removes a control gas to or from the second chamber.

22. A system for mixing and delivering medical liquids to a patient, the system comprising:
   a solvent-supply port;
   a solute-supply port;
   an outlet;
   a measurement chamber;
   a mixing chamber;
   a valve system which controls flow among the solvent-supply port, the solute-supply port, the outlet, the measurement chamber and the mixing chamber;
   an isolatable volume of a control gas in communication with the mixing chamber such that the total volume of the control gas and the liquid in the mixing chamber may be held constant;
   a pressure sensor in communication with the isolatable volume;
   a pressure adjuster which urges fluid into or out of the mixing chamber;
   a delta-volume system which measures changes in volume of liquid in the measurement chamber; and
   a controller, which (i) controls the valve system and the pressure adjuster so as to cause a reference volume of liquid to flow between the mixing chamber and the measurement chamber, (ii) receives pressure data from the pressure sensor before and after the reference volume of liquid has flown between the mixing chamber and the measurement chamber, (iii) receives volume data from the delta-volume system, and (iv) calculates the volume of liquid in the mixing chamber based on (a) the pressure data, (b) the reference volume and (c) the volume of gas in the mixing-chamber when the mixing chamber is empty of liquid.

23. A system according to claim 22, wherein the pressure adjuster includes means for adding or removing a control gas to or from the measurement chamber.

24. A system according to claim 23, wherein the pressure adjuster includes an isolatable-volume pressure adjuster which adjusts the pressure of the control gas in the isolatable volume.

25. A system according to claim 24, wherein the isolatable-volume pressure adjuster includes means for adding or removing control gas from the isolatable volume, wherein in order to isolate the isolatable volume, control gas is prevented from flowing to or from the isolatable volume.

26. A system according to claim 25, wherein the isolatable-volume pressure adjuster includes positive- and negative-pressure reservoirs, which urge control gas into or out of the isolatable volume.

27. A system according to claim 22, wherein the pressure adjuster includes positive- and negative-pressure reservoirs, which urge control gas into or out of the isolatable volume.

28. A method for measuring the volume of a liquid in a subject chamber, the method comprising:

isolating a volume of a control gas in communication with the chamber such that the total volume of the control gas and the liquid is held constant;

measuring the initial pressure of the control gas;

exchanging a reference volume of liquid between the subject chamber and a second chamber, after measuring the initial pressure of the control gas and while the volume of control gas remains otherwise isolated;

measuring the final pressure of the control gas, after the second volume of liquid has been removed from the chamber and while the volume of control gas remains otherwise isolated; and calculating the volume of liquid in the chamber based on (a) the initial pressure, (b) the final pressure, (c) the reference volume and (d) the volume of gas in the subject chamber when the subject chamber is empty of liquid.

29. A method according to claim 28, further including measuring the reference volume of liquid by measuring the change in volume of liquid in the second chamber.

30. A method for measuring the volume of a liquid in a chamber, the method comprising:

isolating a volume of a control gas in communication with the chamber such that the total volume of the control gas and the liquid is held constant;

measuring the initial pressure of the control gas;

removing at least a portion of the liquid from the chamber, after measuring the initial pressure of the control gas and while the volume of control gas remains otherwise isolated, the portion having a second volume;

measuring the final pressure of the control gas, after the second volume of liquid has been removed from the chamber and while the volume of control gas remains otherwise isolated; and calculating the volume of liquid in the chamber based on (a) the initial pressure, (b) the final pressure, (c) the second volume and (d) the volume of gas in the chamber when the chamber is empty of liquid.

31. A method according to claim 30, further including measuring the second volume of liquid removed from the chamber by transferring the reference volume between the subject chamber and a second chamber, and measuring the change in volume of liquid in the second chamber.

32. A method for measuring the volume of a liquid in a chamber, the method comprising:

isolating a volume of a control gas in communication with the chamber such that the total volume of the control gas and the liquid is held constant;

measuring the initial pressure of the control gas;

adding a second volume of liquid to the chamber, after measuring the initial pressure of the control gas and while the volume of control gas remains otherwise isolated;

measuring the final pressure of the control gas, after the second volume of liquid has been added to the chamber and while the volume of control gas remains otherwise isolated; and calculating the volume of liquid in the chamber based on (a) the initial pressure, (b) the final pressure, (c) the second volume and (d) the volume of gas in the chamber when the chamber is empty of liquid.

* * * * *

UNITED STATES PATENT AND TRADEMARK OFFICE
CERTIFICATE OF CORRECTION

PATENT NO.    : 6,321,597 B1
DATED         : November 27, 2001
INVENTOR(S)   : Jason A. Demers et al.

It is certified that error appears in the above-identified patent and that said Letters Patent is hereby corrected as shown below:

Column 8,
Lines 48-49 delete "a mouth through which liquid may flow into and out of the subject chamber"
Line 53, replace "through the mouth" with -- into or out of the subject chamber --.
Line 57, replace "through the mouth" with -- into or out of the subject chamber --.

Column 9,
Lines 6-7, replace "through mouth" with -- between the subject chamber and the second chamber --.

Signed and Sealed this

Fourth Day of November, 2003

JAMES E. ROGAN
*Director of the United States Patent and Trademark Office*